Aug. 28, 1962     H. J. BRAZIER     3,050,986
VISCOSITY SENSITIVE APPARATUS
Filed Dec. 4, 1959     5 Sheets-Sheet 1

Inventor:
Horace James Brazier
BY Baldwin & Wight
attorneys

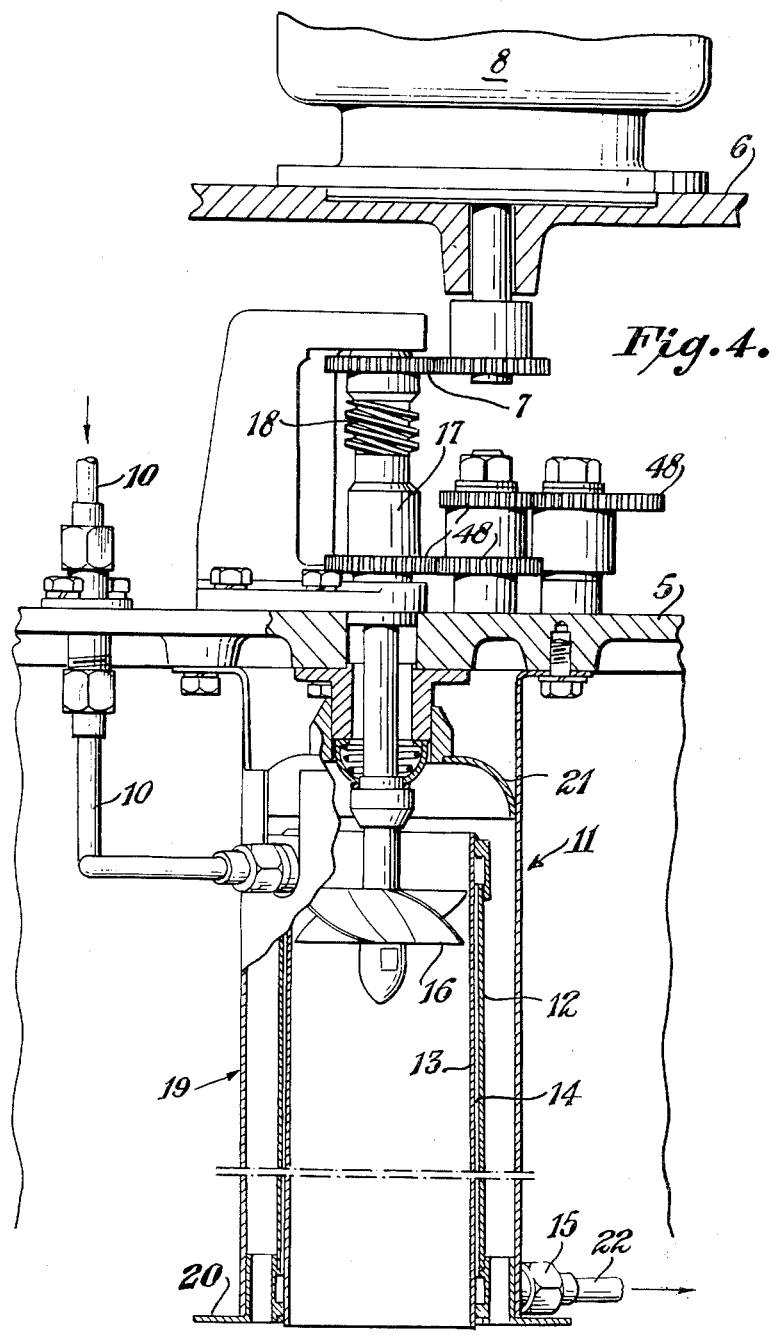

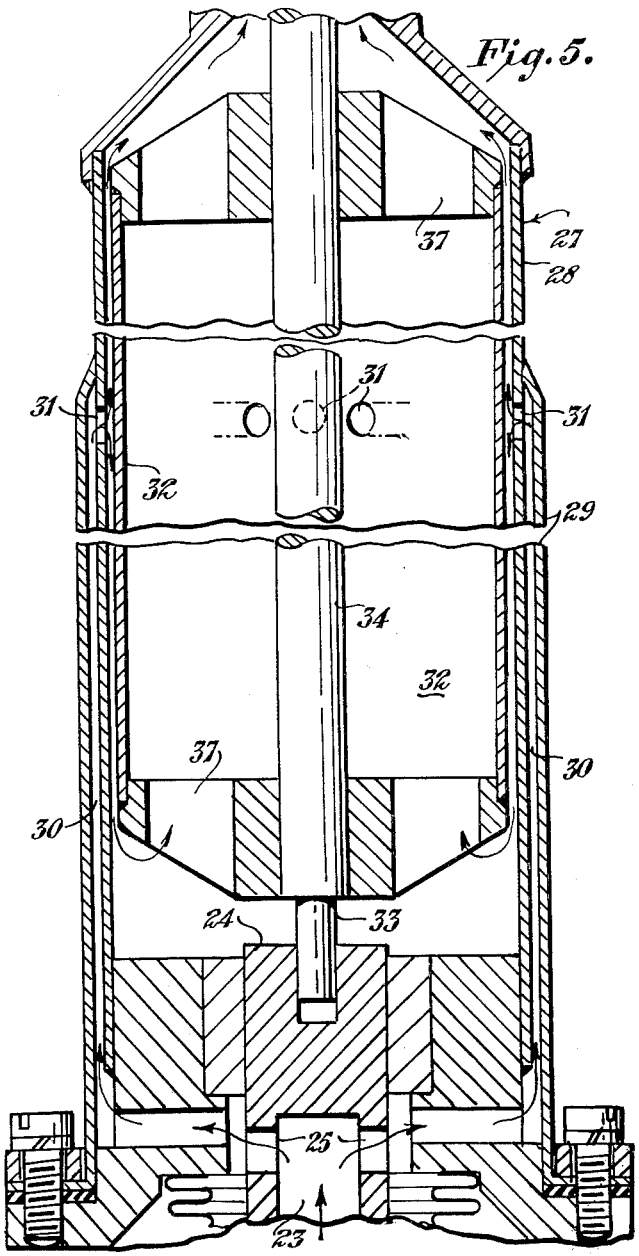

United States Patent Office 3,050,986
Patented Aug. 28, 1962

3,050,986
VISCOSITY SENSITIVE APPARATUS
Horace James Brazier, Ealing, London, England, assignor to S. Smith & Sons (England) Limited, London, England, a company of Great Britain
Filed Dec. 4, 1959, Ser. No. 857,400
8 Claims. (Cl. 73—60)

This invention relates to apparatus for controlling the mixing of a supply of two or more liquids of different viscosities so as to produce a single blend thereof having a predetermined degree of viscosity. The invention will hereinafter be described with reference to the blending of two or more petroleum oils. It should, however, be appreciated that the invention is applicable to the blending of any compatible liquids and the term "oils" hereinafter used is intended to cover any two or more compatible liquids.

According to the present invention, apparatus is provided for controlling the mixing of a supply of two or more compatible liquids, such as oils, of different viscosities to produce a blend thereof having a required, predetermined degree of viscosity. The apparatus operates to equalize the temperatures of a specimen sample of oil having said predetermined viscosity and of a comparable sample of mixed oils to be tested, to pass the specimen and comparable samples, when both are at equal temperatures, respectively through a viscosity sensitive device so as to compare the viscosity of each sample, and to utilize any differential between the relative viscosities of the said samples automatically to regulate the proportion of the volume of the oils being mixed, whereby the final blend of the supply produced has the required predetermined degree of viscosity corresponding to that of the said specimen sample of oil.

It will be appreciated that although there are many ways of determining the viscosity of oil, the degree of viscosity is greatly variable according to temperature. It is, thus, essential according to the invention that, when the comparison of the degree of viscosity of the said samples of oil is effected, both samples of oil are maintained at equal temperature.

Moreover it is desirable that the action of equalizing the temperatures of the samples of oil or of compensating for temperature variation thereof should be effected with as little delay as possible.

Preferably the temperature of the two samples of oil is maintained constant during testing by immersing both the viscosity sensitive devices in a water bath heated to known temperature. In this case, the temperature of both the specimen and comparable samples of oil, when each is passed through its respective viscosity sensitive device, will be equal and corresponding to the temperature of the water in the water bath.

Apparatus according to the invention furthermore comprises a pair of similar viscosity sensitive devices, one of which is arranged to be fed with the specimen sample of oil having the predetermined viscosity and the other of which is arranged to be fed with the comparable sample of mixed oils of different viscosities, means for equalizing the temperature of the two samples of oil before each sample is fed to its respective viscosity sensitive device, and means, operable in dependence upon and differential between the relative viscosities of the specimen and comparable samples of oil, automatically to regulate the proportion of volume of the oils being mixed, whereby the final blend has the required predetermined degree of viscosity corresponding to that of the said specimen sample of oil.

Preferably the apparatus includes a water bath of known temperature in which both viscosity sensitive devices are mounted.

It is visualized that the specimen sample of oil of required viscosity will be circulated more or less continuously through its viscosity sensitive device, and will quickly be able to be equalized with the temperature of the water in the water bath, whilst on the other hand, the comparable sample of oil may not so quickly be equalized with the temperature of the water bath.

Accordingly, the apparatus preferably also includes a heat exchanger immersed in the water bath, said heat exchanger being arranged to be fed with the comparable sample of oil before said comparable sample is introduced into its viscosity sensitive device.

The heat exchanger is preferably of a type in which the comparable sample of oil is forced, in the form of a thin film, between two cooperating surfaces. The provision of the heat exchanger ensures that the comparable sample of oil has increased time during which to become effectively equalized with the temperature of the water bath.

The invention is diagrammatically illustrated by way of example in the accompanying drawings in which:

FIGURE 4 is a fragmentary section along line IV—IV of FIGURE 2, and

FIGURE 5 is a fragmentary vertical sectional view, on enlarged scale, of one of the viscosity sensitive devices.

Figure 1:
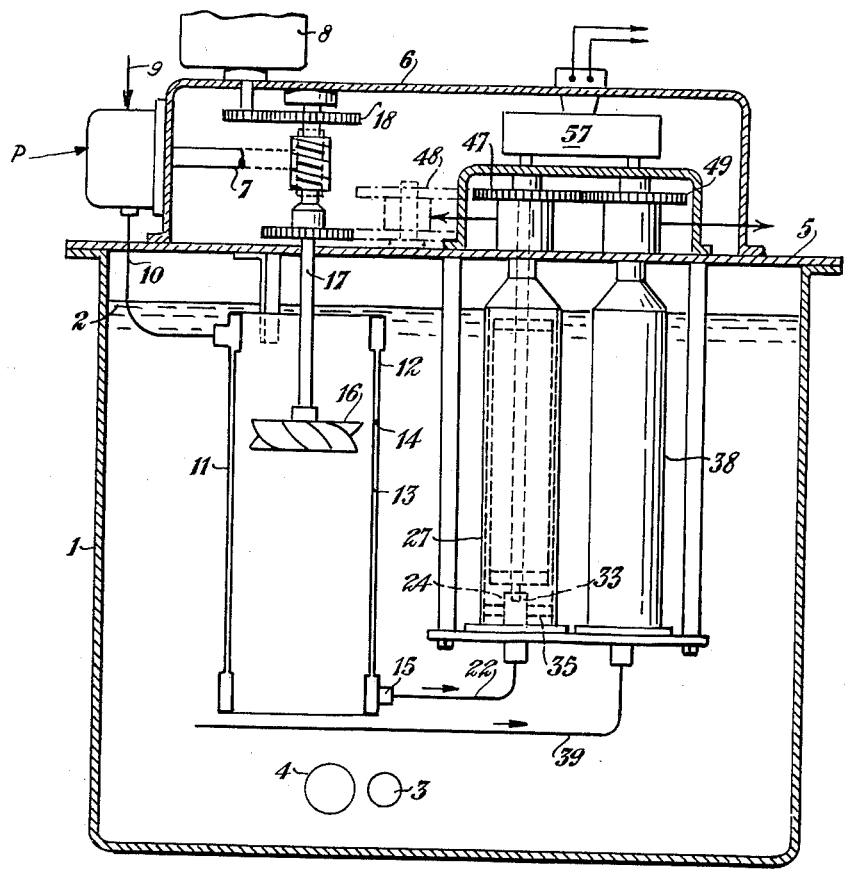
FIGURE 1 is a schematic view of the complete apparatus.
Figure 2:
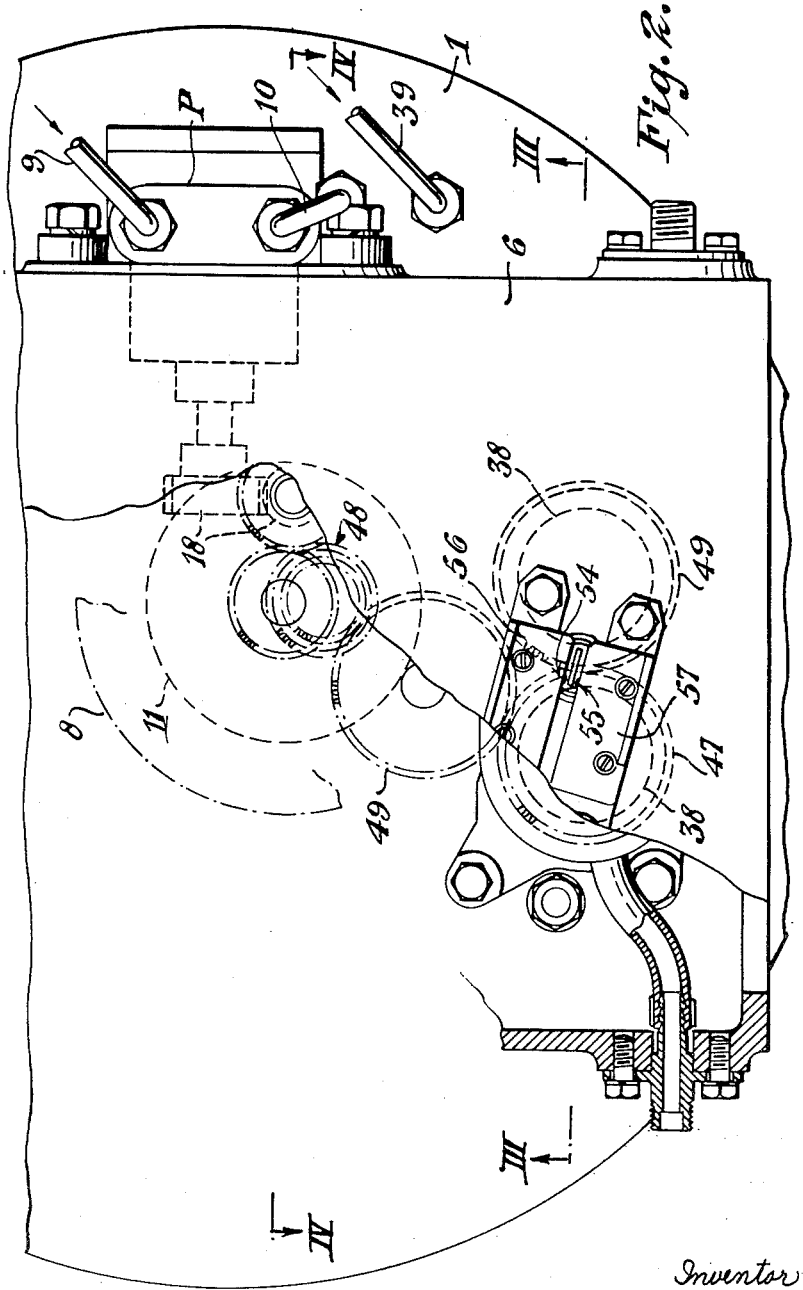
FIGURE 2 is a part plan view.
Figure 3:
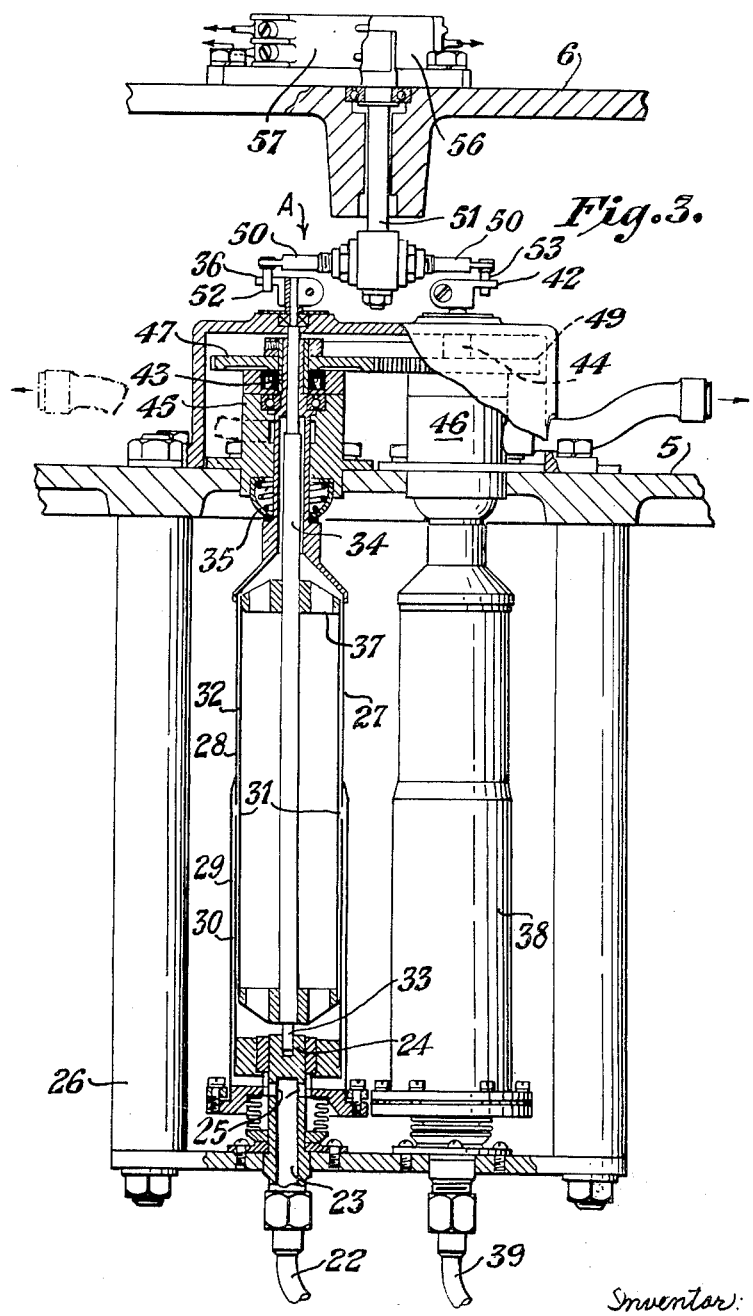
FIGURE 3 is a fragmentary section along line III—III of FIGURE 2.

Referring to the drawings, apparatus embodying the invention comprises a water bath 1 arranged to be filled with water to a predetermined level indicated, for example, at 2. Mounted in the water bath 1 is a variably controllable heat transfer device, as indicated, an immersion heater 3 for heating the water, and a thermostat 4 for maintaining the water at any required or selected temperature level. A plate 5 is detachably secured over the top of the water bath, said plate 5 supporting a box-shaped cover member 6.

Mounted on the cover member 6 is a pump P of known-type, driven, through a worm and gear system generally indicated at 7 and 18, by a motor 8 mounted on the top of the cover member 6. The pump is arranged to receive a sample of a mixture of oils of different viscosities to be compared with a specimen sample of oil of predetermined viscosity. The comparable sample is tapped from a supply mixture and is introduced into the pump P through a supply line 9, and discharged therefrom through a pipe line 10, said pump ensuring a constant output pressure through the pipe line 10.

Mounted in the water bath 1, beneath the predetermined water level, is a heat exchanger 11 comprising an open ended copper cylinder 12, within which nests a similar open ended cylinder 13 of smaller diameter. The relative diameters of the concentric cylinders 12, 13 are such as to form a thin annular space 14 between the two cylinders, said space preferably being of approximately $\frac{1}{12,000}''$ width. The space 14 between the two cylinders is sealed at each end and the pipe line 10 is connected through the outer cylinder 12 to the top of the space 14 whilst a discharge outlet 15 is provided at the bottom of the outer cylinder 13 leading out from the bottom of the space 14.

It will thus be appreciated that the comparable sample of oil, on being introduced into the space 14 between the two cylinders 12, 13 of the heat exchanger circulates therethrough, and is then discharged through the discharge outlet 15.

The relative diameters of the upper and lower ends of this cylinders 12, 13 may be varied so as to increase the width of the space 14 at these points to $\frac{1}{10}''$, in order to ensure free circulation of the comparable sample of oil around the top and bottom of said space 14.

Extending into the water within the hollow inner cylinder 13 of the heat exchanger is an impeller device 16 mounted at the end of a spindle 17 rotatably driven through the drive 18 by the motor 8. The heat exchanger is provided with a cylindrical cover plate 19 having a right angled flange 20 at its base and an umbrella shaped cowl 21 at its head, which cowl is spaced from the body of the cover so as to overhang the open tops of the two cylinders 12, 13 and through which cowl 21 the spindle 17 of the impeller 16 is passed.

On rotation of the impeller 16, heated water from the water bath is drawn up through the hollow inner cylinder 13 to strike the umbrella-shaped cowl 21 which deflects the water down over the outer cylinder 12 on to the right angled flange 20 of the cover plate 19, said flange tending to distribute the water across the base of the water bath 1.

The comparable sample of oil, on being circulated through the annular space 14 is thus quickly and effectively brought to a temperature equal to that of the heated water in the water bath.

The discharge outlet 15 from the heat exchanger unit is connected by means of a pipe line 22 to an axial bore 23 extending partway up a stub spindle 24 and then communicating with discharge ports 25 arranged circumferentially midway around the said spindle, the ports 25 discharging liquid from the supply line 22 and serving as an inlet to the viscosity sensitive device 27. The stub spindle 24 is mounted on the base of an open box shaped casing 26 secured to the under side of the plate 5, and serves to support a viscosity sensitive device 27, illustrated on enlarged scale in FIGURE 5 of the drawings, through which device the comparable sample of oil is to be fed.

The viscosity sensitive device 27 is of the rotating cylinder type and comprises an outer cylinder 28, the base of which is rotatably mounted in seal tight engagement over the stub spindle 24 above the discharge ports 25 formed therein.

A cylindrical jacket 29 is provided over the lower three quarters of the outer cylinder 28, the top end of the jacket cylinder 29 being welded to the outer cylinder and the lower end of said jacket being extended below the bottom of the outer cylinder 28 and being rotatably mounted similarly in seal tight engagement over the stub spindle 24 but in a position below the discharge ports 25.

It will be appreciated that this arrangement provides an annular gap 30 between the jacket 29 and the outer cylinder 28 and allows the comparable sample of oil to come from the heat exchanger, via the pipe line 22, into the bore 23 of the stub spindle 24, out through the discharge ports 25 formed around the perimeter thereof and into the gap 30. A number of ports 31 are formed at a zone intermediate the opposite ends of the wall of the outer cylinder 28 below the point where the jacket 29 is secured to said wall, thus enabling the comparable sample of oil to pass to the inside of the cylinder 28.

Nesting concentrically within the outer cylinder 28 is a smaller cylinder 32, the base of which is sealed onto a spindle 33 rotatably mounted on the blind head of the stub spindle 24. The top of the inner cylinder 32 is sealed on to a spindle 34 which extends up through a seal tight bush 35 mounted in an aperture in the plate 5, the top of the spindle 34 being rigidly secured to a pronged member 36 cooperating with a control device A, hereinafter to be described.

The perimeter of the top and bottom of the inner cylinder 32 is provided with a number of holes 37 providing an outlet from the viscosity sensitive device 27 so that the comparable sample of oil introduced, as described previously into the inside of the outer cylinder 28, is able to circulate freely up and down both the inside and the outside of the inner cylinder 32 as indicated by the arrows on FIGURE 5 of the drawings. Thus, the comparable sample of liquid flows from the zones of the ports 31 in opposite directions respectively towards the ends of the cylinders 28 and 32. The comparable sample of oil is then drained away from the head of the outer cylinder 28 or fed back to source.

Mounted on the base of the casing 26 and adjacent the viscosity sensitive device 27 is a second viscosity sensitive device 38 of identical construction. This second device 38 is arranged to have continuously circulated therethrough, a specimen sample of oil of a required predetermined viscosity supplied from a pipe line 39 and returned thereto from the head of the outer cylinder of the said second device 38.

The purpose of introducing the samples of specimen and comparable oil into their respective viscosity sensitive devices at an intermediate point is to obviate the likelihood of any end pressure occurring or of unequal pressure of flow of said samples through said devices.

In the second viscosity sensitive device 38, the spindle fixed on the head of the inner cylinder of the device is rigidly secured to a pronged member 42 of the control device A, diametrically opposite the pronged member 36 of the first viscosity sensitive device 27.

Rigidly mounted respectively on the heads of the first and second viscosity sensitive devices are upstanding hollow shafts 43, 44 which extend up through seal tight glands 45, 46 in the plate 5.

Rigidly mounted on the head of the hollow shaft 43 of the first viscosity sensitive device 27 is a toothed wheel 47 which in operation is rotatably driven at a constant speed through a gear train 48 by the main motor 8. In mesh with the toothed wheel 47 is a similar toothed wheel 49 rigidly mounted on the head of the hollow shaft 44 of the second viscosity sensitive device 38.

It will thus be appreciated that being in mesh, the toothed wheels 47 and 49 rotate in counter direction but at the same, constant speed, and, being rigidly connected respectively to the outer cylinders of the two viscosity sensitive devices, 27, 38 similarly rotate said cylinders in counter direction. Thus, for example, if the outer cylinder of the first viscosity sensitive device 27 is rotated clockwise, the comparable sample of oil being circulated through and around the inner cylinder of the device will impart a clockwise torque to the said inner cylinder. At the same time the outer cylinder of the second viscosity sensitive device 38, being driven by the first device, will be rotated in a counterclockwise direction and the specimen sample of oil being circulated therein will impart a counterclockwise torque on the inner cylinder of said second device.

It will be appreciated that if the relative viscosities of the comparable and specimen samples of oil are identical, then the clockwise torque induced on the inner cylinder of the first viscosity sensitive device 27 will be equal to the counterclockwise torque imparted to the inner cylinder of the second viscosity sensitive device 38. On the other hand if the relative viscosities of the comparable and specimen samples of oil are not the same there will be a differential in the torque imparted respectively to the inner cylinder of the two viscosities sensitive devices.

The control device A utilizes this differential to produce a signal when the viscosities of the two samples differ, and to control the volume supply of the oils being mixed. The control device A comprises a horizontal arm 50 secured to a vertical rotatable spindle 51, mounted on the cover member 6 and depending therefrom. From one end of the arm 50 depends a fixed rod 52 which freely engages between the prongs of the pronged member 36 attached to the spindle 34 fixed on the head of the inner cylinder of the first viscosity sensitive device 27, and from the opposite end of the arm 50 depends a similar rod 53 which freely engages between the prongs of the pronged member 42 attached to the spindle fixed on the head of the inner cylinder of the second viscosity sensitive device. The head of the spindle 51 is arranged between two oppositely positioned contacts 54, 55 of respective micro switches 56, 57, mounted on the top of the cover member 6. The head of the spindle 51 is suitably shaped to be able to actuate either of said contacts, so that when the spindle 51 is rotated in one direction, the spindle head actuates the contact 54 of the micro switch 56, whilst conversely when the spindle is rotated in the opposite direction, the spindle head actuates the contact 55 of the other micro switch 57. The micro switches 56, 57 respectively control, through electrically operated control valves (not shown), the volume of the oils being mixed.

In operation, if the viscosity of the comparable sample of liquid continuously delivered to the first viscosity sensitive device 27 is greater than the viscosity of the specimen sample of liquid continuously delivered to the second viscosity sensitive device 38, the torque, imparted to the inner cylinder of the first device 27, for example, clockwise directional, will be stronger than the counter directional, i.e. counterclockwise, torque imparted to the inner cylinder of the second viscosity sensitive device.

The stronger torque of the inner cylinder of the first device will thus rotate the spindle 32 in a clockwise direction, which will cause the pronged member 36 to engage the depending rod 52 so as to move the arm 50 of the control device A similarly in a clockwise direction, which action in turn causes the contact 54 to actuate the micro switch 56 arranged to regulate the proportion of the volume supply of one of the oils being mixed.

Conversely if the viscosity of the comparable sample of oil is less than the viscosity of the specimen sample of oil, there is greater torque imparted to the inner cylinder of the second viscosity sensitive device than there is imparted to the inner cylinder of the first viscosity device. In this case the differential in torque will rotate the spindle 32 in a counterclockwise direction and, through the engagement of the pronged member 36 with the depending rod 52, the arm 50 of the control device A will be similarly rotated in a counterclockwise direction, thus causing the contact 55 to actuate the micro switch 57 arranged to regulate the proportion of the volume supply of the other of the oils being mixed.

The control device A is adjustable so that the arm 50 can be set so as to occupy a position in which, when the viscosities of oils being pumped through the first and second viscosities sensitive devices are equal, the contacts 54, 55 do not actuate either of the micro switches 56, 57 but lie midway between said micro switches.

It should be appreciated that apparatus according to the invention may suitably be used with a number of specimen samples of oils each having a known but different viscosity. In this case, a tank is provided for each specimen oil of predetermined different viscosity, said tanks being connected through selector valves to the supply line of the second viscosity sensitive device. All that is then necessary is to charge the second viscosity sensitive device with a sample of the specimen oil having the viscosity to which it is intended to blend the oils of the main supply and to operate the apparatus in the manner previously described.

It is not, however, essential to re-set the control device A when re-charging the second viscosity sensitive device with a new specimen sample of oil of different required viscosity, since the initial setting ensures that the microswitches are not actuated by their contacts as long as oils of equal viscosities are pumped respectively through the first and second viscosities sensitive devices, and providing that this is so and the relative viscosities of the sample are equal, the specific viscosities of said samples is unimportant.

What I claim is:

1. Viscosity sensitive apparatus for producing a signal in accordance with a difference between the viscosities of two liquids, comprising a first supply line for receiving a specimen sample of one liquid having a required predetermined degree of viscosity, a water bath, a first viscosity sensitive device, immersed in said water bath, for continuously receiving said specimen sample of liquid from said first supply line, a second supply line for receiving a comparable sample of another liquid, a heat exchanger, immersed in said water bath, for continuously receiving said comparable sample of liquid from said second supply line, a second viscosity sensitive device, immersed in said water bath, for continuously receiving said comparable sample of liquid from said heat exchanger, a heater immersed in said water bath, a thermostat for controlling said heater to establish in said water bath and in said sample liquids delivered respectively to said first and second viscosity sensitive devices substantially equalized temperatures selected for accurate comparison of the viscosities of said samples, and means coupled to said viscosity sensitive devices and operable in dependence upon the differential between the relative viscosities of said specimen and said comparable sample of oils, automatically to produce a signal.

2. Apparatus according to claim 1 in which said first and second viscosity sensitive devices each comprise an outer cylinder, an inner cylinder rotatably mounted within said outer cylinder, and an inlet and an outlet for the sample liquid continuously delivered between said cylinders by the associated supply line, and in which means are provided for rotating said outer cylinders of said first and second viscosity sensitive devices in counter-direction to each other, whereby similar counter-rotation of said inner cylinder of said first and second viscosity sensitive devices in dependence upon the viscosity respectively of said specimen and said comparable samples of liquids is obtained, and any differential between the degree of said counter-rotation of said inner cylinders is utilised automatically to produce said signal.

3. Apparatus according to claim 1 in which said means, operable in dependence upon any differential between the viscosities of said specimen and said comparable samples of liquid to produce a signal, comprises a movable arm, indirectly coupled to both said first and said second viscosity sensitive devices, electro mechanical switches, operable on movement of said movable arm, and means operable by said switches.

4. Apparatus according to claim 1 in which said heat exchanger comprises a pair of concentric cylinders defining a thin annular space continuously therebetween, said space receiving said comparable sample of oil for travel through said space and continuous delivery therefrom to said second viscosity sensitive device.

5. Apparatus according to claim 4 including an impeller for moving bath water in one direction through the inner one of said concentric cylinders.

6. Apparatus according to claim 5 including an umbrella shaped cowl adjacent one end of the cylinder assembly for deflecting bath water moved toward said one end by said impeller to flow in the opposite direction outside of said outer cylinder.

7. In apparatus for producing a signal in accordance with a difference between the viscosities of two liquids, a first viscosity sensitive device responsive to the viscosity of a first liquid; a second viscosity sensitive device responsive to the viscosity of a second liquid and comprising two concentric, rotatable cylinders defining therebetween a flow path for said second liquid, means for delivering said second liquid through the wall of one of said cylinders intermediate the opposite ends of said wall into said flow path in a zone intermediate the ends of said cylinders for flowing in said flow path from said zone in opposite directions respectively towards the ends of said cylinders, and means for rotating one of said cylinders whereby the frictional drag of the liquid in said flow path will turn the other of said cylinders, in dependence upon the viscosity of said second liquid; and means responsive to the relative responses of said first and second viscosity sensitive devices for producing a signal.

8. Apparatus according to claim 7 additionally comprising a further cylinder concentric with said one of said cylinders to provide a jacket space between said further cylinder and said one of said cylinders, and means connecting said further cylinder to said one of said cylinders to rotate therewith, said means for delivering said second liquid communicating with both said flow path and said jacket space.

References Cited in the file of this patent

UNITED STATES PATENTS

| | | |
|---|---|---|
| 1,746,525 | Darrah | Feb. 11, 1930 |
| 2,120,351 | Decker | June 14, 1938 |
| 2,280,947 | Gulliksen | Apr. 28, 1942 |
| 2,325,573 | Thompson et al. | July 27, 1943 |
| 2,986,925 | Gentry et al. | June 6, 1961 |